Figure 1:
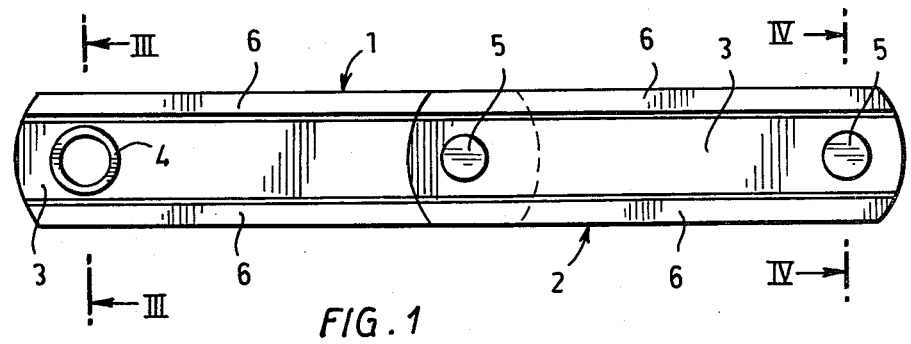

United States Patent [19]

Vatja

[11] 4,437,565
[45] Mar. 20, 1984

[54] CONVEYOR CHAIN

[75] Inventor: Aulis Vatja, Eura, Finland

[73] Assignee: Lonnstrom Oy, Koylio, Finland

[21] Appl. No.: 328,480

[22] Filed: Dec. 8, 1981

[30] Foreign Application Priority Data

Dec. 22, 1980 [FI] Finland .................................. 804001

[51] Int. Cl.³ ............................................ B65G 17/38
[52] U.S. Cl. ...................................... 198/851; 474/228
[58] Field of Search ....................... 198/850, 851, 853;
474/228, 230, 231; 59/31, 18; 219/51, 52

[56] References Cited

U.S. PATENT DOCUMENTS 2,319,979  5/1943  Collins .............................. 198/853
3,246,734  4/1966  Carvallo ............................ 198/851

Primary Examiner—John J. Love
Assistant Examiner—Paul A. Sobel
Attorney, Agent, or Firm—Murray Schaffer

[57] ABSTRACT

The invention relates to a conveyor chain intended for use, for example, in wood transporters. In order to be able to securely fasten the sleeves and the trunnions of the chain to their side plates, preferably by welding, projecting edge flanges are formed in the side plates so that the weld in each case is left in the trough formed by the edge parts.

2 Claims, 4 Drawing Figures

CONVEYOR CHAIN

The present invention relates to a conveyor chain the links of which comprise side plates and interconnected sleeves and trunnions fastened to said side plates.

The sleeves and trunnions in known conveyor chains are in general mounted in corresponding holes in the side plates by means of a simple press fit. Attempts have been made to reinforce the mounting by removing material from the side plate and correspondingly widening the end of the sleeve or trunnion. However, by means of a collar of this type sufficient strength is not achieved and, for example, in modern wood conveyors in which the chains are repeatedly exposed to lateral impacts caused by the logs, the trunnions and sleeves, respectively, in the chains quite often are disengaged causing severe interruptions in production.

Attempts have been made to solve the problem by welding the sleeves of the inner links to the inside of the side plates. In this case, however, the inner width of the chain is reduced and also the chain wheel must be made narrower. In addition, the chain wheel exerts wear on the weld, and the welding itself is laborious.

It has also been suggested to lengthen the sleeve and to weld it externally by a filled weld. The disadvantage is that the projecting part of the sleeve and the weld exert a heavy wear on the side plate of the outer link. Therefore, this solution has not been in wide use.

It has further been suggested to weld the sleeves and trunnions to the side plates externally so that, in order to obtain a smooth outside, material has been removed from the side plate around the trunnion and the sleeve to form a welding gap either in the side plate, trunnion or the sleeve. This gap has thereafter been filled with a weld. It is true that in this way a conveyor chain of a satisfactory strength is obtainable but the method has proved to be much too laborious and expensive.

The trunnions have also been welded externally by means of a filled weld. In this case, however, no smooth side surface is obtained in the chain which facilitates the lateral guidance of the chain.

Plastic runner rails are extensively used under the chain. As the side plates have been rather narrow the surface pressure between the edge of the side plate and the plastic rail has been considerable resulting in rapid wear of the plastic.

The object of the present invention is provide a new conveyor chain which eliminates the above-mentioned disadvantages.

The conveyor chain according to the invention is mainly characterized in that the side plates of both the inner links and the outer links are provided with projecting edge flanges.

Owing to the projecting edge flanges in the side plates, the sleeves and trunnions, respectively, of the chain links are able to project from their mounting holes whereby they can be fastened to the side plates by means of a simple weld. With regard to side plates of a uniform thickness, savings in material are also obtained while the resistance to wear of the longitudinal edges of the side plates remains equally good. The edge flanges are, of course, made so wide that they function as sliding surfaces between the links and outwards.

In the following the invention will be described with reference to the accompanying drawing.

FIG. 1 is a side view of two successive links of a conveyor chain.

Figure 2:
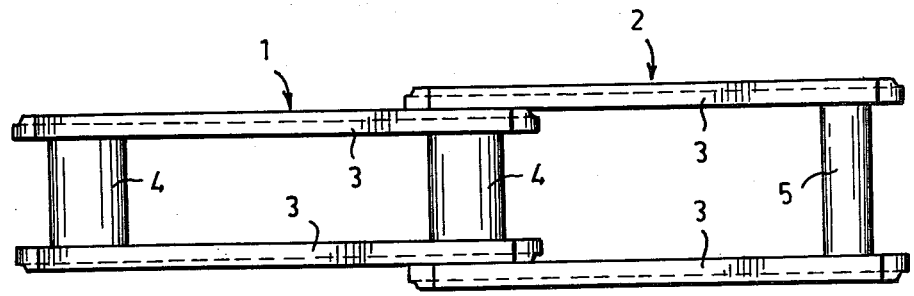
Figure 3:
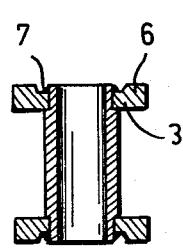
Figure 4:
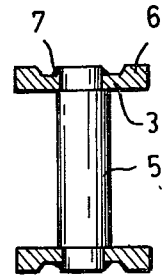

FIG. 2 is a top view of the links.
FIG. 3 is a section taken along line III—III in FIG. 1.
FIG. 4 is a section taken along line IV—IV in FIG. 1.

In the drawings, the reference numeral 1 denotes an inner link of a chain and the reference numeral 2 an outer link of a chain. Both the inner link 1 and the outer link 2 comprise two side plates 3 which are preferably identical with each other. The links are connected to each other in a conventional manner through a sleeve 4 of the inner link and a trunnion 5 of the outer link. The side plates 3 are provided with outer edge flanges 6 which project some distance from the central part of the plate and form the necessary sliding surfaces. As an example it may be mentioned that, if the thickness of the central part of the side plate 3 is 8 mm, the thickness of the edge areas 6 can be 12 mm. The sleeves 4 and the trunnions 5 project from the holes in the side plates a distance corresponding to the thickness of the edge flanges 6, at the most. The projection is still sufficiently large so as to allow fastening of the sleeves and trunnions externally to the side plates 3 by means of a simple weld 7.

The drawings illustrate a preferred embodiment of the invention in which the edge flanges 6 of the side plates of both the inner links and the outer links are directed outwards whereby the welding of both the sleeves 4 and the trunnions 5 is easy to carry out. If the side plate of the inner link were oppositely turned so that the edge flanges 6 would be directed inwards, it would still be more or less just as easy to carry out the weldings.

In principle, the space required for the filled weld could also be provided by directing the edge flanges in the side plate of the outer link inwards and by directing the edge flanges of the inner link outwards. In this case, however, it would be difficult to produce the last weld between the side plate 3 and the trunnion 5.

In the embodiment shown in the drawing, the chain sleeves 4 and trunnions 5 are welded to the side plates 3 which is considered to be the most preferred manner of fastening. However, it should be mentioned that the conveyor chain according to the invention also permits riveting of the projecting heads of the sleeves and the trunnions, whereby considerably better strength is achieved than through the collar formation preferred to as prior art.

What we claim are:

1. A conveyor chain formed of a plurality of inner and outer links, each link comprising a pair of substantially rectangular planar side plates, one of said pair of links having a pair of spaced sleeves and the other of said links having a pair of spaced trunnions, said sleeves and trunnions being seated adjacent their ends respectively in said side plates, said sleeves and trunnions being welded to one surface of the respective side plates, and said side plates having a pair of flanges projecting from the surface of said plates to which said sleeves and trunnions are welded, said flange projecting along the longitudinal edges of said plates a distance at least equal to the extension created by said welds.

2. The conveyor chain according to claim 1 wherein said side plates have inner and outer surfaces and said sleeves and trunnions extend through said plates and project outwardly beyond the outer surfaces respectively, said flanges projecting from the outer surface of said plates a distance at least equal to the projection of said sleeves and trunnions.

* * * * *